(12) United States Patent
Pedrosa Santos

(10) Patent No.: US 12,181,899 B2
(45) Date of Patent: Dec. 31, 2024

(54) METHOD FOR CONTROLLING COOLING IN ELECTRICAL EQUIPMENT AND ELECTRICAL EQUIPMENT WITH CONTROLLED COOLING

(71) Applicant: Treetech Sistemas Digitais Ltda, Atibaia (BR)

(72) Inventor: Daniel Pedrosa Santos, Atibaia (BR)

(73) Assignee: Treetech Sistemas Digitais Ltda, Atibaia (BR)

( * ) Notice: Subject to any disclaimer, the term of this patent is extended or adjusted under 35 U.S.C. 154(b) by 711 days.

(21) Appl. No.: 17/604,308

(22) PCT Filed: Apr. 1, 2020

(86) PCT No.: PCT/BR2020/050111
§ 371 (c)(1),
(2) Date: Jun. 21, 2022

(87) PCT Pub. No.: WO2020/210885
PCT Pub. Date: Oct. 22, 2020

(65) Prior Publication Data
US 2022/0342433 A1     Oct. 27, 2022

(30) Foreign Application Priority Data
Apr. 17, 2019    (BR) .......................... 102019007902-9

(51) Int. Cl.
*G05D 23/19* (2006.01)
*H01F 27/08* (2006.01)

(52) U.S. Cl.
CPC ......... *G05D 23/1917* (2013.01); *H01F 27/08* (2013.01)

(58) Field of Classification Search
CPC ......... G05D 23/19; H01F 27/08; H01H 37/72
See application file for complete search history.

(56) References Cited

U.S. PATENT DOCUMENTS

| 7,962,250 B2 | 6/2011 | Bretzner et al. |
| 2016/0195891 A1 | 7/2016 | Divan et al. |
| 2017/0011612 A1 | 1/2017 | Jain |

FOREIGN PATENT DOCUMENTS

BR      PI0619815 A2    10/2011

OTHER PUBLICATIONS

IEEE Guide for Loading Mineral-Oil-Immersed Transformers and Step-Voltage Regulators, IEEE Power & Energy Society, IEEE Std C57.91-2011, Mar. 7, 2012.
(Continued)

*Primary Examiner* — Vincent H Tran
(74) *Attorney, Agent, or Firm* — Lippes Mathias LLP

(57) ABSTRACT

The present invention refers to a cooling control system and method for electrical equipment (10) and the electrical equipment (10) with controlled cooling, wherein the use of at least one cooling means (15) is dynamically considered, according to the operation of the electrical equipment (10) whose aging is determined mainly through a life balance (LB), which is, in turn, used to determine a selective activation for the cooling means (15), thus ensuring a continuous use lifetime specified by its manufacturer, while at the same time optimizing the lifespan of the cooling means (15), preserving it as much as possible while maintaining the lifespan of the electrical equipment (10) at a predetermined aging calculated through lifespan balance, avoiding unnecessary operating expenses for maintaining the cooling system.

32 Claims, 4 Drawing Sheets

(56) References Cited

OTHER PUBLICATIONS

IEC 60076-7 International Standard, Power transformers—Part 7: Loading guide for mineral-oil-immersed power transformers, IEC 60076-7:2018-01(en), Edition 2.0, Jan. 2018.
ABNT/CB-003, 2° Projeto Abnt NBR 5356-7, Mar. 2017, Transformadores de potencia, Parte 7: Guia de carregamento para transformadores imersos em liquido isolante, Mar. 2017, (English abstract provided).
International Search Report (with English translation) mailed Jun. 27, 2020 for International Application No. PCT/BR2020/050111.
Written Opinion mailed Jun. 27, 2020 for International Application No. PCT/BR2020/050111.
International Preliminary Report on Patentability (with English translation) dated Aug. 2, 2021 for International Application No. PCT/BR2020/050111.

METHOD FOR CONTROLLING COOLING IN ELECTRICAL EQUIPMENT AND ELECTRICAL EQUIPMENT WITH CONTROLLED COOLING

The present invention refers to a cooling control system and method for electrical equipment, configured to obtain machine aging data and obtain a corresponding life balance, defining at least one ideal selective activation temperature from the cooling means, all within at least one operating threshold. The present invention also refers to electrical equipment with controlled cooling.

DESCRIPTION OF THE STATE OF THE ART

Power transformers and reactors are essential for supplying electricity to cities and industries. Designed to operate for decades without replacement, the deterioration of insulation material around their windings is the main end-of-life criterion. The speed at which the insulation material—generally a special paper made from a cellulose base and soaked in oil—deteriorates is closely related to the operating temperatures.

As set forth in the NBR5356-7, IEC60076-7 and C57.91-2011 Standards established by the Institute of Electrical and Electronics Engineers (IEEE), transformer operating temperatures affect the aging speed of the insulation material accordingly to the Arrhenius law: when the machine is operated at greater temperatures than it was projected to do so, the transformer durability is significantly reduced. Similarly, when transformers is operated at lower temperatures, they may last many years longer.

Technical specifications and standards categorize materials, so that behaviors are known, in terms of temperatures. For example, Brazil's ABNT NBR5356-7, the IEC 60076-7 Standard and the IEEE C57.91-2011 Standard categorize thermostabilized and non-thermostabilized papers that can withstand temperature increases of 65° C. and 55° C. respectively.

To ensure that the transformer—or reactor—does not overheat, its cooling system is typically comprised of the following stages:

Oil Natural and Air Normal (ONAN): comprises the stage wherein the cooling of the machine results from natural convection of the insulating oil, which exchanges heat with the walls of the transformer or with the radiator installed. Heat exchange efficiency depends on ambient temperature and the intensity of the wind that blows naturally on the radiator and walls of the transformer;

Oil Natural and Air Forced (ONAF): comprises the stage assisted by fans that blow wind onto the radiators, in order to enhance cooling efficiency and speed up the natural convection of the oil. There may be more than one group of fans installed on a machine, and the individual activation of these groups creates the following stages: ONAF1, ONAF2, etc.;

Oil Forced and Air Forced (OFAF): comprises the stage wherein the cooling of the machine is also helped by pumps forcing the oil to circulate, speeding up the heat exchange; and Oil Directed and Air Forced (ODAF): comprises the stage wherein the pumps direct the oil flow along the winding, through channels, or some other similar resource.

There are also transformers with other types of cooling equipment, such as radiators that exchange heat with cooled water, instead of air (OFWF), although they are less common.

Nowadays, temperature monitors measure the temperature at the top of the oil and in the flow running through the winding of the transformer—or reactor—in order to calculate the hotspot temperature, which is the hottest point on the winding, and consequently the point where the insulation material ages most quickly. Without the cooling system controlled proposed by this invention, the monitors generally regulate transformer temperatures in the following ways:

a) By threshold: temperature thresholds are selected for activating the cooling devices. When reaching the set value, according to the stages activated, it continues to run until the temperature drops below the shut-off level, which is normally the same as the activation temperature, minus a hysteresis. Should the temperature rise to the next threshold, instead of dropping, the next cooling stage is activated. When there are no more stages available, the transformer is taken out of operation before it is damaged. This final operation is known as "tripping";

b) By load: similar to the previous method, except the cooling equipment is activated by the transformer load, instead of the temperature. The monitor knows the transformer load, as it measures the windings current and knows the rated properties of the machine. This method is actually an indirect temperature control, which is often used to supplement the first option, as it can start the cooling operations earlier; and c) By time: although not common, transformer cooling may be scheduled to coincide with the time when the machine is known to be under heavier thermal demands.

The methods described above are more appropriate for providing the machine with heat protection, rather than controlling the duration of its lifespan. Although offering some protection for durability, they do so in ways that are not efficient or not efficacious at all. Sometimes temperatures that are lower than necessary may switch on the cooling equipment for machines that heat up only sporadically, with much of their lifespan saved, wearing out cooling systems and wasting electricity in the process. The opposite also happens, as the cooling systems of machines that usually run hot may switch on in a "delayed" manner, meaning that temperatures remain higher than necessary for preserving their lifespan. Even if the machine is protected against thermal faults, such as the flashpoint, these methods do not preserve the lifespan of the transformer adequately.

Even when activation temperature thresholds of the coming stages are calculated by typical load and ambient temperature for the location where the transformer will operate, there is usually a difference between the forecast and actual lifespan. This gap expands as the loading conditions and climate profile change over the years, with the initial adjustments becoming steadily less efficient.

FIGS. 1 and 2 exemplify the difficulty of setting the on/off temperatures for a set of fans in a consistent manner that preserves the lifespan of the transformer. In this case, cold weather keeps the temperature of the machine below the cooling threshold for longer periods, with the machine aging faster on summer, when temperatures rise steeply and cooling is activated. Although the machine is fully protected against thermal faults in both cases, there are no guarantees of its durability.

Consequently, no efficacious means are known in the prior art for controlling the cooling of electrical machines, and which are configured to ensure their durability.

Purposes of the Invention

An objective of the present invention is to provide a cooling control system and method for electrical equipment.

An objective of the present invention is to provide a cooling control system and method for electrical equipment, configured to obtain machine aging data and obtain a corresponding life balance.

An objective of the present invention is to provide a cooling control system and method for electrical equipment configured to define at least one ideal selective activation temperature for the cooling means.

An objective of the present invention is to provide a cooling control system and method for electrical equipment configured to calculate a life balance related to at least one machine aging data.

An objective of the present invention is to provide a cooling control system and method for electrical equipment configured to control the cooling of the electrical equipment, based on at least the life balance.

An objective of the present invention is to operate the cooling means with the greatest possible efficiency, ensuring the lifespan of the electrical equipment by operating the cooling system as little as possible, optimizing the operating and maintenance costs of the electrical equipment and the cooling system.

An objective of the present invention is to ensure at least the minimum durability for the electrical equipment and ensuring that the transformer lasts at least as long as the lifespan projected by the manufacturer, despite changes in operating conditions.

An objective of the present invention is to provide electrical equipment with controlled cooling.

BRIEF DESCRIPTION OF THE INVENTION

The objectives of the present invention are achieved by means of a cooling control system and method for electrical equipment comprising at least one sensor set, at least one cooling means, and at least one controller electrically connected to each other, the system and cooling control method for electrical equipment, being configured to obtain at least one theoretical machine aging, one real machine aging and one life balance and defining at least one ideal selective activation temperature for the cooling means, all within at least one operating threshold.

BRIEF DESCRIPTION OF THE DRAWINGS

The present invention will be described in greater details below, based on an example of embodiment illustrated in the figures. The figures show.

DETAILED DESCRIPTION OF THE FIGURES

In order to project an electrical equipment 10 with an adequate lifespan, a manufacturer must consider a variety of parameters such as, for example, the load profile and the climate or environment with which the electrical equipment 10 will operate throughout its lifespan. Knowing these characteristics, it is possible to select an appropriate insulation material and design geometry, windings and cooling means 15 of such equipment 10.

Considering the characteristic of the insulation material employed and the lifespan of the electrical equipment 10, a lifespan "graph" was obtained that must be understood as a temperature within which the electrical equipment 10 can achieve a lifespan equal to its projected lifespan, if kept constant.

As will be explained in detail and discussed below, the system and cooling control method for electrical equipment and electrical equipment with controlled cooling proposed by the present invention are configured to constantly calculate a loss of lifespan for an insulation material and accumulate a life balance LB in a "life bank", adding negative portions when aging is accelerated or positive portions in the opposite case. Next is to dynamically configure the activation temperatures of the cooling system so that the life bank is rapidly brought down to zero.

The invention can alternatively also control other parameters as well, such as, for example, cooling intensity, instead of the temperature thresholds for activating the stages.

To do so, one of the parameters taken into consideration is the temperature at a point called the hotspot 25, which is the hottest point on at least one winding of the electrical equipment 10.

Figure 1:
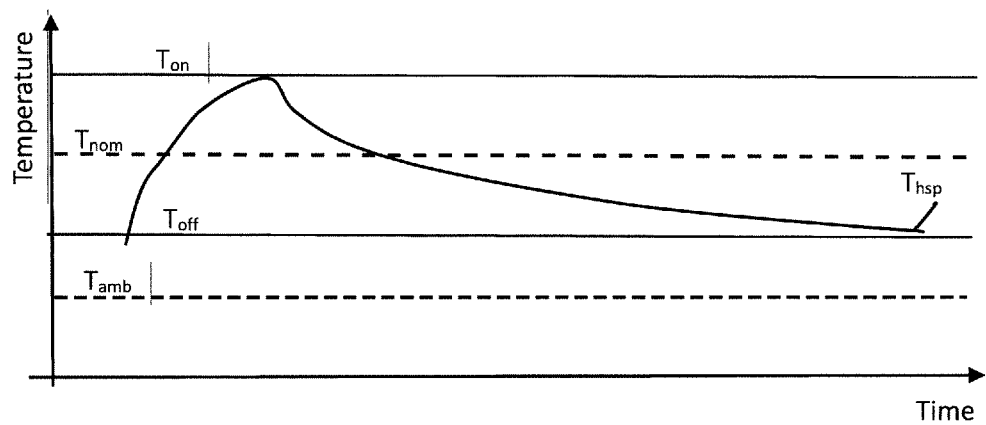
FIG. 1—is a graph exemplifying a variation in the temperature at the hotspot on a hot day.

FIG. 1 is a sketch of a curve for the temperature $T_{hsp}$ at the hotspot 25 on a hot day, with parameters related to an ambient temperature Iamb, a nominal temperature $T_{nom}$ of the transformer (lifetime line) and a maximum temperature $T_{on}$ and a minimum temperature $T_{off}$ of the transformer, whereby the cooling system may be switched on and off. In this Figure, it is noted that the said transformer is fitted with an "ordinary" temperature controller: in other words, the cooling means 15 switches on and off at set temperatures.

As may be noted in this Figure, on a hot day the temperature rises rapidly to the point where the cooling means 15 is switched on, in other words, the maximum temperature $T_{on}$. Once switched on, it removes heat from the electrical equipment 10 slowly, as the surroundings do not easily absorb the heat drawn from the electrical equipment 10.

However, it is noted that the temperature of the electrical equipment 10 remains below the lifetime line (in other words, below the nominal temperature $T_{nom}$) for quite some time, before dropping to the point of switching off the cooling means 15, in other words, the minimum temperature $T_{off}$.

In this way, the period during which the electrical equipment 10 spends at a temperature below the lifetime line is greater than the time spent above it, extending its lifespan at the expense of the cooling means 15, which remains active longer.

Figure 2:
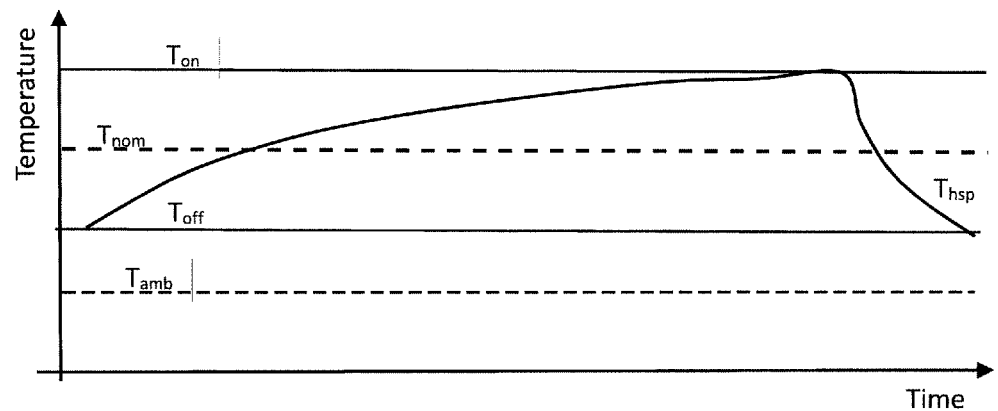
FIG. 2—is a graph exemplifying a variation in the temperature at the hotspot on a cold day.

In turn, FIG. 2 is a sketch of the temperature $T_{hsp}$ at the hotspot 25 on a cold day, showing the same parameters for the ambient temperature $T_{amb}$, the maximum temperature $T_{on}$ and the minimum temperature $T_{off}$, also shown in FIG. 1. In this case also, the machine temperature controller is "regular", in other words, it switches the cooling means 15 on and off at set temperatures.

As is noted in FIG. 2, on the cold day the temperature rises slowly to the point where the cooling means 15 is switched on. Once switched on, this removes heat from the electrical equipment 10 faster, as the surroundings absorb the withdrawn heat more easily.

However, the temperature of the electrical equipment 10 remains above the lifetime line for quite some time, before rising to the point of switching on the cooling means 15.

In this way, the time during which the electrical equipment 10 spends at a temperature above the lifetime line is greater than the time spent below it, shortening its lifespan with insufficient action for the cooling means 15, which remains inactive for long periods of time.

In this context, comparing the circumstances in FIG. 1 with those in FIG. 2, it is noted that systems with fixed cooling criteria (for example, ventilation) might result in errors when calculating the lifespan of the electrical equipment 10 under surprising circumstances.

It is also noted that the cooling means 15 is used heavily at times when it could be spared, and spared at times when it should be used. This is one of the main reasons behind the creation of the present invention, which will be described in greater detail below.

Figure 6:
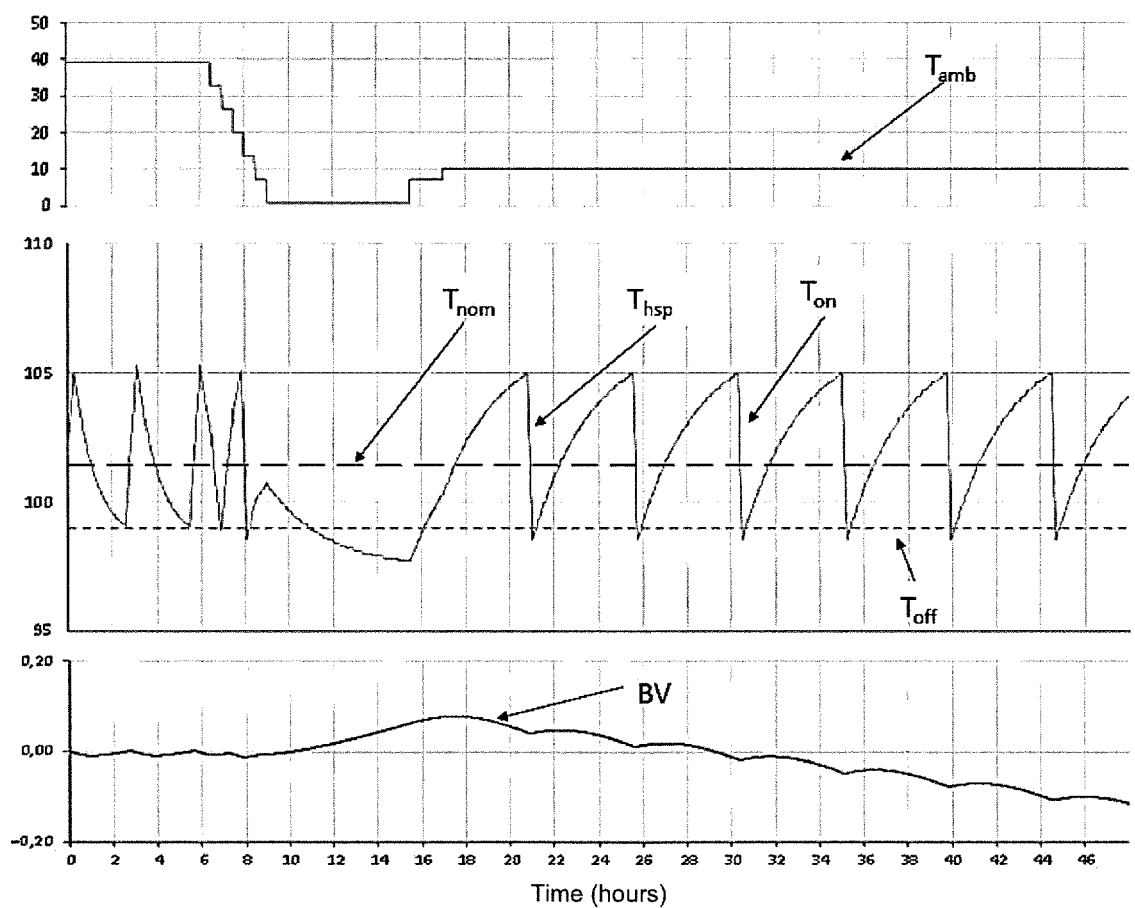
FIG. 6—is an example simulation, demonstrating the actuation of the system known in the prior art, whether ventilation operates between set values and what varies is the ambient temperature, which is shown as an ambient temperature in the first graph, with a cooling control in the second graph, and the life balance shown in the third graph.

Additionally, FIG. 6 exemplifies a computer simulation demonstrating the actuation of a traditional system (prior art), within which the cooling means 15 operates between fixed values. In the simulation, the electrical equipment 10 is a reactor with a fixed load. What varies is the ambient temperature.

In this Figure, it is noted that the graph begins at a condition where the limits are appropriate for the current operating conditions, whereby the life balance LB remains around zero.

Then there is the ambient temperature $T_{amb}$, which varies from about 39° C. to 2° C., whereby the electrical equipment 10 remains cool, although the cooling means 15 is switched off. When the temperature $T_{hsp}$ of its hotspot 25 falls below the so-called "lifetime line", the life balance LB begins to rise. The cooling means 15 remains switched off and the electrical equipment 10 continues to accumulate life until its surroundings heat up again.

When this happens, and the temperature $T_{hsp}$ of the hotspot 25 rises above the "lifetime line", the life balance begins to drop. When the temperature $T_{hsp}$ of the hotspot 25 finally reaches the cooling limit, the cooling means 15 is once again activated, and the on/off cycle begins again.

However, the new ambient temperature means that the waveform for the temperature of the electrical equipment 10 changes completely.

It is noted that the upward edge switches from almost linear to convex, while the downward edge changes from concave to almost linear. Consequently, although the limits remain the same, the new condition increased the temperature above the lifetime line on the upward edge and lowered it below the downward edge.

This loss of life is repeated consistently with each cooling cycle, as long as the condition continues. By accumulating moments such as this, it is understood that the electrical equipment 10 will not last as long as its projected lifespan.

In contrast to what intuition might initially suggest, in practice it is known that this happens when the combination of ambient temperature and load is moderately "milder" than that taken into consideration when selecting the thresholds.

Figure 7:
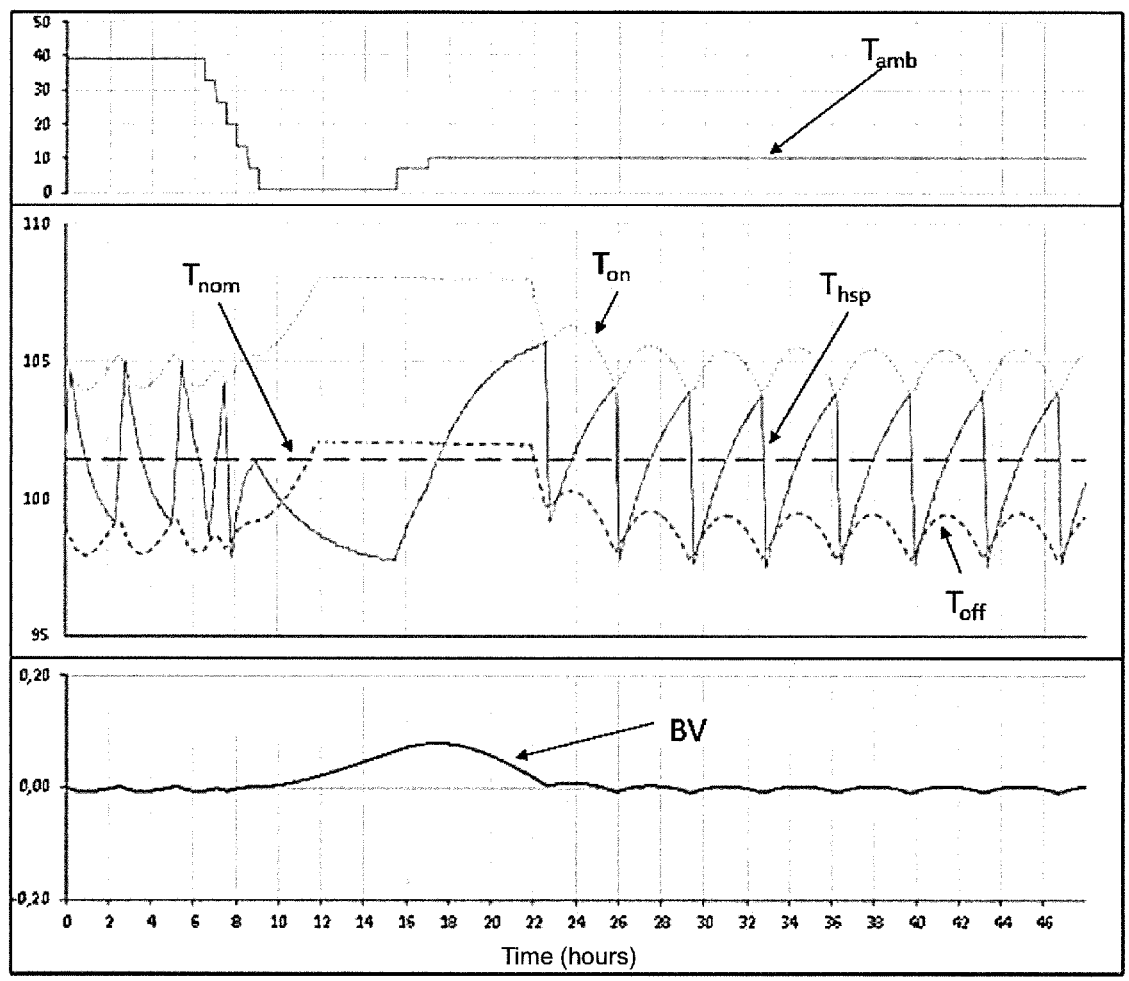
FIG. 7—is an example simulation, demonstrating the actuation of the system, method, and equipment of the present invention, wherein the cooling system activation thresholds are adjusted dynamically, which is shown as an ambient temperature in the first graph, with a cooling control in the second graph, and the life balance shown in the third graph.

FIG. 7 shows the same simulation, but with the activation limits adjusted dynamically, in accordance with the invention proposed herein. It is clearly apparent that the limits are now modulated continuously, which keeps the life balance LB under control, at around zero.

While the environment is cold, it is possible to see that the life accumulation increased the limits (compliant with the pre-set safety limit) in a manner that saves the cooling element 15. This delayed their activation when the environment started to heat up again, and the life balance was rapidly brought back to zero.

In the last part of the graph, the limits are adjusted dynamically if they remain below the conventional system, safeguarding the electrical equipment 10 against the loss of life that would otherwise occur.

As shown in this Description and Figures, there is a huge gain in performance and reliability at a low cost, according to the teachings of this invention, which will be described in greater detail below.

Similarly, looking at FIGS. 1 to 7, the present invention refers to a cooling control system 1 in electrical equipment 10, where the electrical equipment 10 is preferably embodied as electrical transformers, but may alternatively be embodied as other electrical machines, such as reactors, for example.

Figure 3:
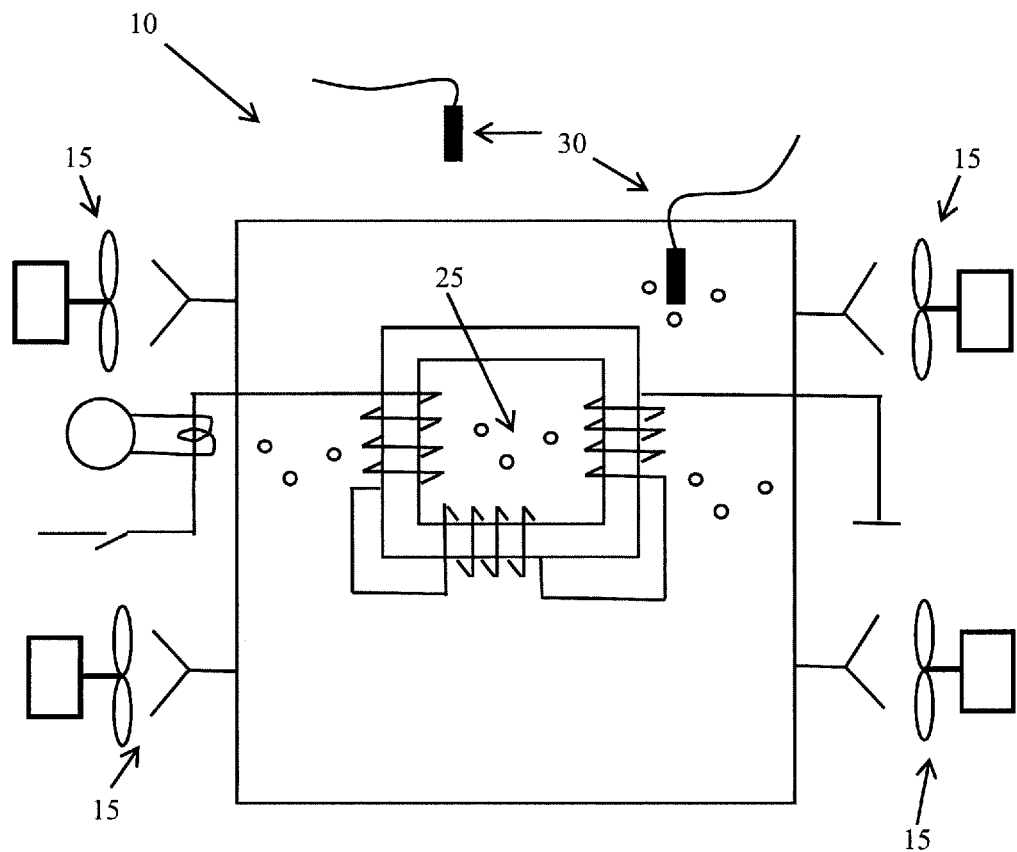
FIG. 3—is a schematic representation of a part of the electrical equipment, showing the hottest point on the windings (hotspot)
Figure 4:
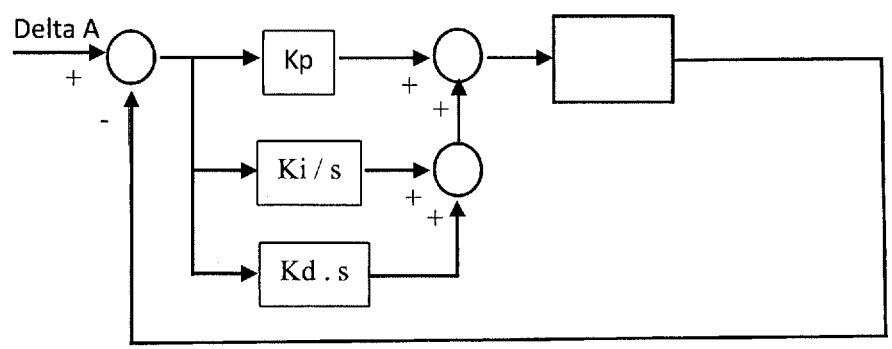
FIG. 4—is a block diagram of an embodiment of this invention through a PID controller.
Figure 5:
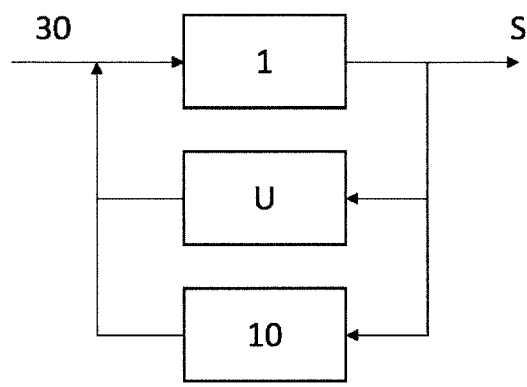
FIG. 5—is a schematic representation of an embodiment of this invention, mainly showing the data from the sensors installed on the monitored electrical equipment and feedback with commands, especially to the cooling means.

With regard to the cooling control system 1 in electrical equipment 10, this comprises at least one sensor set 30, at least one cooling means 15, and at least one controller 20 electrically connected to each other, as exemplified principally in FIGS. 3 to 5.

In one embodiment, the sensor set 30 comprises at least one from among a temperature sensor, a moisture sensor, and an electrical magnitude sensor (multimeter, voltmeter, amperemeter, etc.) and alternatively comprise other additional sensor elements, such as vibration sensors. Moreover, integration may be provided with other types of equipment, such as a dryer, for example.

In one embodiment, the sensor set 30 corresponds, for example, to temperature sensors that measure the temperature close to the electrical equipment 10 and at a position called the "top of the oil", defined by the manufacturer. Based on the temperature at the top of the oil and the load of the electrical equipment 10, it is possible to calculate the hotspot 25 of the machine, which is the point where it is hottest.

With regard to the cooling means 15, this may be embodied as at least one fan, ventilator, cooler, radiator, etc., and may be switched on all together or partially, depending on its embodiment. It is thus noted that this is not a limiting characteristic of this invention, whereby other components can be used to cool the electrical equipment 10, such as forced circulation pumps, for example.

As described in greater detail below, the cooling control system 1 in electrical equipment 10 is configured to obtain at least one theoretical machine aging $Acorrected_t$, a real machine aging $Acorrected_r$ and a life balance LB, as well as defining at least one ideal temperature $T_{ideal}$ for the selective activation of the cooling means 15 within at least one operating threshold $L_o$.

More specifically, the theoretical machine aging Acorrected$_t$ is preferably obtained through at least one from between a theoretical aging parameter A$_t$ and a theoretical deterioration parameter D$_t$.

In one embodiment, the theoretical aging parameter A$_t$ is calculated based on at least one theoretical aging temperature θ$_t$ defined by an user U, as will be explained below. With regard to the user U, this may be a person, a computer system, and a warning board, among others. It represents anything for which the data generated by the invention is relevant.

The Arrhenius Equation allows a speed constant variation to be calculated for a chemical reaction with the temperature. Several Standards, such as NBR5356-7 and C57.91-2011, adjust the Equation parameters according to the specific reaction that rules the aging A for a part of the electrical equipment:

$$A = 9.8 \cdot 10^{-18} \cdot e^{\frac{15000}{\theta+273}} \quad \text{(Equation 1)}$$

where "Θ" must preferably be understood as a temperature in Celsius.

Equation 1 above expresses the aging of the insulation, in an example of a temperature of 110° C. (Θ=110° C.), which is the lifetime line in this example. In the lifetime line, A=1. The aging A will be less than 1 when the temperature is greater than Θ, and otherwise will be greater than 1.

However, it is understood that the aging model based on the Arrhenius Equation may be improved by adding the influence of moisture to the effects of temperature. For example, the C57.91-2011 Standard established by the Institute of Electrical and Electronics Engineers (IEEE) states that the insulation paper deterioration rate is directly proportional to its water content, with the reference moisture level being U$_{ref}$ (the moisture level at which aging is purely thermal) is typically between 0.2% and 0.3%. This information may be written mathematically, as shown in Equation 2 below, which exemplifies the calculation of an additional deterioration D:

$$D = \frac{U_{ref}}{U_\%} \quad \text{(Equation 2)}$$

Consequently, Equation 2 takes into consideration a moisture percentage U$_\%$ and a reference moisture U$_{ref}$ which may be 0.2%, for example. Consequently, such additional deterioration D must be multiplied by the aging A of Equation 1.

Hence, the theoretical machine aging Aadjusted$_t$ is obtained, for example, through theoretical parameters as shown in Equation 3 below:

$$\text{Aadjusted}_t = A_t \cdot D_t \quad \text{(Equation 3)}$$

which may in turn also be exemplified as shown below:

$$\text{Aadjusted}_t = \left(9.8 \cdot 10^{-18} \cdot e^{\frac{15000}{\theta+273}}\right) \cdot \left(\frac{0.2\%}{U_\%}\right) \quad \text{(Equation 3)}$$

In this Equation, for calculating the theoretical machine aging Acorrected$_t$, it must be understood that preferably the theoretical temperature in Celsius Θ$_t$ should be used. Thus, the theoretical aging Acorrected$_t$ parameter is calculated based on at least one theoretical aging temperature Θ$_t$ defined by the user U.

One embodiment allows the user U to select a value for the theoretical machine aging Aadjusted$_t$ (desired) such as, for example:

1 to obtain the rated aging speed forecast in a handbook for the machine; or 0.85 to obtain a slower aging speed at 15% of the face value.

Naturally, when selecting a speed that is lower than the rated level, heavier demands will be imposed on the cooling system, with lighter demands when selecting a higher speed. Moreover, it is stressed that the values mentioned above must be understood only as examples of possible embodiments of this invention, whereby other values may also be used.

An alternative embodiment of this invention comprises an indirect way of the user U determining the theoretical machine aging Acorrected$_t$, where the expected lifespan of the transformer is programmed in years and months.

In this embodiment, once the theoretical machine aging Acorrected$_t$ parameters are programmed through the invention, it calculates the aging speed.

Similarly, the real machine aging Aadjusted$_r$ is obtained through at least one from between a real aging Aadjusted$_r$ parameter and a real deterioration D$_r$ parameter, as shown in Equation 4 below:

$$\text{Aadjusted}_r = A_r \cdot D_r \quad \text{(Equation 4)}$$

$$\text{Aadjusted}_r = \left(9.8 \cdot 10^{-18} \cdot e^{\frac{15000}{\theta_r+273}}\right) \cdot \left(\frac{0.2\%}{U_\%}\right) \quad \text{(Equation 4)}$$

Wherein, in this case, the real aging parameter Aadjusted$_r$ is calculated, based on at least one real aging temperature Or measured by the sensor set 30.

Furthermore, it is noted that the theoretical and real aging parameters A$_t$, A$_r$ respectively are based on at least one temperature at one hotspot 25, and the deterioration parameters D$_t$, D are based on at least one moisture parameter, obtained through the sensor set 30.

When an embodiment is not set to act on moisture in the electrical equipment, the adjustment of the cooling system will be reconsidered, in order to offset the effect of this on the aging speed as well, improving the accuracy of the adjustments for the operation with no access to the moisture content.

On the other hand, when the electrical equipment is equipped with drying means such as, for example, an online oil dryer, the invention can control—using the same methods as those described—the activation of this drying means in parallel to the cooling system, enhancing its aging control capacity.

In this manner, a preferred embodiment comprises the application of the Arrhenius Equation with influence from only the temperature, which is the model most commonly accepted.

However, it must be noted that there are other formulas and methods that may be used alternatively to calculate the lifetime of the transformer, including other aging acceleration variables. Such methods may also be programmed into the invention and its respective sensors.

With regard to the life balance, this is preferably obtained through at least one comparison between the theoretical machine aging Aadjusted$_t$ and the real machine aging Aadjusted$_r$. Alternatively, the life balance may be obtained through other comparisons and data.

As mentioned, once the user U defines the theoretical parameters for calculating the theoretical machine aging Aadjusted$_r$, in other words, meaning that the desired aging speed or lifespan is defined, work begins on calculating the life balance LB.

In one embodiment, a difference deriving from the above-mentioned comparison is positive when the real aging is slower than the rated speed and negative when it is accelerated.

In other words, a preferred embodiment comprises the life balance LB, which is configured to be calculated as a positive balance when the real machine aging Acorrected$_r$ is less than the theoretical machine aging Acorrected$_t$ and calculated as a negative balance when the real machine aging Acorrected$_r$ is greater than the theoretical machine aging Acorrected$_t$.

When the life balance LB presents a positive total balance, this means that there is an opportunity to save on the use of the cooling means 15 without affecting the lifespan guaranteed by the manufacturer of the electrical equipment 10, in other words, the cooling means 15 may be switched off or used to a lesser extent, for example, without adversely affecting the lifespan guaranteed by the manufacturer of the electrical equipment 10.

On the other hand, when the life balance LB presents a negative total balance, this gives rise to the need to step up the use of the cooling means 15.

When the life bank LB is at zero, this indicates that the use of the cooling means 15 is optimized.

In other words, and briefly, the life balance LB is positive when the rated aging rate is greater than the real aging rate and negative when the real aging parameter is greater than the rated aging parameter, wherein the negative life portion is calculated as the life balance LB when accelerated aging is calculated, and a positive life portion is calculated as the life balance LB when delayed aging is calculated.

With this, the cooling control system 1 in electrical equipment 10 is configured to control the cooling of the electrical equipment 10, based on at least the life balance LB.

As mentioned above, the cooling control system 1 in electrical equipment 10 is configured to selectively alter at least one from between the activation temperatures of the cooling means 15 and a cooling intensity.

Furthermore, one embodiment is comprised when a module of the life bank LB balance is high, and no downtrend is noted within a scheduled length of time, and the user U is notified that the aging of the electrical equipment 10 is out of control.

In this context, the user U is informed of the real machine aging Acorrected$_r$ (actual aging speed, together with a new calculated lifespan). This warning is particularly critical when the controlled balance is negative, as it represents a rush towards the end of life for the machine, should nothing be done to rectify the situation.

One embodiment allows a positive balance to be calculated when the life bank LB balance is below the upper limit for the life bank LB. In one embodiment, resulting from a difference in the importance of the positive or negative no-control warnings, as exemplified, the positive and negative limits of the life bank LB may be programmed individually by the user U.

As an example, should the user U select an embodiment where the highest acceptable balance is zero, the positive life portions will no longer be calculated, as soon as the accelerated aging periods have been offset.

In this way, the system 1 is configured to work towards offsetting accelerated aging moments, preferably with no concern over offsetting excess accumulated life.

In this case, the user U considers that the value of gains achieved through optimizing the use of the cooling means 15 is irrelevant, compared to a possible increase in the lifespans of the electrical equipment 10. This is why the invention is configured to not calculate positive life portions as from the time when the life bank balance ceases to be negative, or some other value programmed by the user U.

In one embodiment, it is noted that, even when there is an upper limit programmed for the life bank LB, the positive portions may still be recorded in an ancillary life bank, which may subsequently be used for studies, but without necessarily influencing the operation of the cooling control system 1 in electrical equipment 10.

With this, there is an embodiment that saves the life bank LB balance in a database (i.e., logs or records) that may be consulted and copied at any time. This allows studies to be conducted of the thermal behavior of the monitored electrical equipment 10, in addition to re-purposing the accumulated information in another system 1 or electrical equipment 10, as well as a situation in which a new system 1 or electrical equipment 10 is desired, replacing and continuing the work of a system 1 or electrical equipment 10 used previously.

Over the years, when an electrical equipment 10 is replaced by another similar item, the user U has the choice of programming the initial balance of the life bank LB in the new equipment 10. Consequently, the new equipment 10 may be configured to continue the work of its predecessor, with no losses.

This embodiment can also favor the expansion of the use of the invention for new electrical equipment 10 and/or machines with similar designs and uses.

Moreover, as already mentioned above, a possible embodiment comprises the cooling control system 1 in electrical equipment 10, being configured to generate at least one output S. In one embodiment, for example, the output S may be configured to be an issue of at least one alarm at least when the life balance LB module exceeds at least one limit pre-established by the user U and/or when no downtrend is detected for the life balance LB module, for example.

The output S may be configured as alerts announcements, notifications, and self-diagnoses of interest to the user U. Anomalies, alterations to the usage profile of the electrical equipment 10, loss of control of life, and other results of analyses of the invention may also become part of this output S.

Physically, output S configured in a manner such as an alarm may be embodied as a simple relay, which responds to a specific set of overcoats, communication through a man-machine interface of the equipment 10 or a datum that may be sent through a digital communication port, such as RS-485 or Ethernet, in order to feed data into computers and management systems.

Consequently, a possible embodiment comprises a warning that will be issued when the cooling means 15 is unable to keep machine aging within the target range. Additionally, a real aging rate and a new projected lifespan may also be calculated for the machine, should no action be taken.

As explained previously, one embodiment of this invention allows control over the activation limits of the cooling means 15 or the generation of parameters for controlling their intensity, depending principally on the available infrastructure.

Similarly, one embodiment of this invention comprises the cooling control of the electrical equipment 10 being configured to comprise at least one from between/among selectively activating the cooling means 15, defining at least one ideal temperature Tweet or defining the operating threshold $L_o$.

As will be better described below, the operating threshold $L_o$ is preferably configured as a range of temperatures within which the system 1 can define the ideal temperature $T_{ideal}$ for the selective activation of the cooling means 1.

In one embodiment, the user U must program the operating thresholds $L_o$ of the cooling control. In this case, the temperature range (operating thresholds $L_o$) in which the system is free to position the ideal temperature $T_{ideal}$ for the cooling means 15 must be selected carefully. This is because, if the system is allowed to select temperatures above the oil flashpoint, the transformer will no longer be heat-protected and may catch fire.

Once a life bank LB has been established and the cooling control operating thresholds $L_o$ have been programmed, the system will use some method for deciding, at each moment, the ideal activation temperature $T_{ideal}$ for the cooling stages.

As described above, the present invention also comprises a cooling control method for electrical equipment 10, wherein the electrical equipment 10 is preferably embodied as electrical transformers, but may alternatively be embodied as other electrical machines, such as reactors, for example.

Nevertheless, the electrical equipment 10 comprises at least one sensor set 30, at least one cooling means 15, and at least one controller 20 electrically connected among themselves.

As mentioned previously, the sensor set 30 comprises at least one from among a temperature sensor, a moisture sensor, and an electrical magnitude sensor (multimeter, voltmeter, amperemeter, etc.) and alternatively comprise other additional sensor elements, such as vibration sensors.

With regard to the cooling control method for electrical equipment 10 per se, this comprises a step of obtaining at least one theoretical machine aging Acorrected$_t$, wherein the theoretical machine aging Acorrected$_t$ is obtained through at least one from between a theoretical aging parameter $A_t$ and a theoretical deterioration parameter $D_t$.

More specifically, the theoretical aging parameter $A_t$ is calculated, based on at least one theoretical aging temperature $\Theta_t$ defined by the user U, as already mentioned, particularly in Equation 1 presented above.

On a supplementary basis, the method addressed by this invention is embodied to consider the influence of moisture as well, in addition to temperature. This influence is modeled mathematically through Equation 2, mentioned previously.

Consequently, the theoretical machine aging Acorrected$_t$ is obtained, for example, through theoretical parameters such as those presented principally in the previous Equations 3 and 4, wherein the theoretical aging parameter $A_t$ is calculated, based on at least one theoretical aging temperature $\Theta_t$ defined by the user U.

The cooling control method for electrical equipment 10 also comprises a step of obtaining at least one real machine aging Acorrected$_r$, similar to the step described above.

The real machine aging Acorrected$_r$ is obtained through at least one from between a real aging parameter $A_r$ and a real deterioration parameter $D_r$, as shown in Equation 4 already described.

It is noted that in this step, the real aging parameter $A_r$ is calculated based on at least one real aging temperature Or measured by the sensor set 30.

It is also worth noting that the theoretical and real aging parameters, respectively $A_t$, $A_r$, are based on at least one temperature at the hotspot 25, and the deterioration parameter is based on at least one moisture parameter obtained through the sensor set 30, as already explained above.

The cooling control method for electrical equipment 10 comprises also a step of obtaining at least the life balance LB. This parameter is preferably obtained at least through a comparison between the theoretical machine aging Acorrected$_t$ and the real machine aging Acorrected$_r$. Alternatively, the life balance may be obtained through other comparisons and data, as already described.

Thus, once the user has U defined the theoretical parameters for calculating the theoretical machine aging Acorrected$_t$, in other words, the desired aging speed or lifespan are defined, the life balance LB may be calculated.

As already described, a difference deriving from the above-mentioned comparison is positive when the real aging is slower than the rated speed and negative when it is accelerated.

In other words, a preferred embodiment comprises the life balance LB being configured for calculation as a positive balance when the real machine aging Acorrected$_r$ is less than the theoretical machine aging Acorrected$_t$, computing a negative balance when the real machine aging Acorrected$_r$ is greater than the theoretical machine aging Acorrected$_t$.

As already described, when the life balance LB presents a positive total balance, this means that there is an opportunity to save on the use of the cooling means 15 not affecting the lifespan guaranteed by the manufacturer of the electrical equipment 10, in other words, the cooling means 15 may be switched off or used to a lesser extent, for example, without the lifespan guaranteed by the manufacturer of the electrical equipment 10 being adversely affected.

On the other hand, when the life balance LB presents a negative total balance, it means the cooling means 15 must be activated.

When the life bank LB is zero, this indicates that the use of the cooling means 15 is optimized.

With this, the cooling control method for electrical equipment 10 is embodied to encompass a step of controlling the cooling of the electrical equipment 10, based on at least the life balance LB.

Preferably, this happens in the sense that the proposed method selectively alter at least one from between the activation temperatures of the cooling means 15 and a cooling intensity.

Furthermore, one embodiment of the proposed method comprises an additional step in which when one module of the life bank LB balance is high, and no downtrend is noted within a predetermined period of time, the user U is notified that the aging of the electrical equipment 10 is out of control.

One embodiment allows a positive balance to be calculated when the balance of the life bank LB is below its upper limit. In one embodiment, the positive and negative limits of the life bank LB may be programmed individually by the user U.

In this context, the user U is informed of the real machine aging Acorrected$_r$ (actual aging speed, together with a new calculated lifespans), similar to the matters already described above.

As mentioned, the proposed method may also be configured to encompass an additional step in which the positive portions may continue to be recorded in an ancillary life bank, which may subsequently be used for studies, but not necessarily influencing the other steps of the method.

Additionally, the method may also comprise a step of generating at least one output S, being configured, for example, to set at least one alarm at least when the life balance LB module exceeds at least one limit pre-defined by the user U and/or when no downtrend is detected for the life balance LB module, for example.

The cooling control method for electrical equipment 10 is configured to allow control over the activation limits of the cooling means 15 or generate the parameters for controlling their intensity, depending on the available infrastructure.

Along these lines, the method preferably also comprises a step of defining at least one ideal temperature $T_{ideal}$ for the selective activation of the cooling means 15 within at least one operating threshold $L_o$, whereby this operating threshold $L_o$ must be understood as a range of temperatures, endowed with the characteristics mentioned above.

Consequently, the method addressed by this invention is configured to allow the user U to program the operating thresholds $L_o$ of the cooling control.

With this, once a life bank LB has been established and the cooling control operating thresholds $L_o$ have been programmed, the system will use some method for deciding, at each moment, the ideal activation temperature $T_{ideal}$ for the cooling stages.

Compatible with the system and methods described herein, the present invention also comprises an electrical equipment 10 comprising at least one sensor set 30, at least one cooling means 15, and at least one controller 20 electrically connected among themselves.

The sensor set 30 comprises at least one from among a temperature sensor, a moisture sensor, and an electrical magnitude sensor, and may include other sensors, as already described above.

According to the aforementioned characteristics, the cooling of the electrical equipment 10 is configured to be controlled, based on at least one life balance LB, configured with one upper limit and one lower limit, defined individually.

One embodiment is where the life balance LB is obtained at least through a comparison between a theoretical machine aging Acorrected$_t$ and a real machine aging Acorrected$_r$ as already described, wherein the life balance LB is configured to be calculated as a positive balance when the real machine aging Acorrected$_r$ is less than the theoretical machine aging Acorrected$_t$ and calculating a negative balance when the real machine aging Acorrected$_r$ is greater than the theoretical machine aging Acorrected$_t$.

In other words, one embodiment allows a positive balance to be calculated when the life bank LB balance is below the upper limit for the life bank LB.

The theoretical machine aging Acorrected$_t$ is obtained through at least one among a theoretical aging parameter $A_t$ and a theoretical deterioration parameter $D_t$, with the theoretical aging parameter $A_t$ being calculated, based on at least one theoretical aging temperature $\Theta_t$ defined by the user U, principally in accordance with Equation 3, already described.

In turn, the real machine aging Acorrected$_r$ is obtained through at least one from between a real aging parameter $A_r$ and a real deterioration parameter $D_r$, the real aging parameter $A_r$ being calculated on the basis of at least one real aging temperature $\Theta r$ measured by the sensor set 30, principally in accordance with Equation 4 already described.

Consequently, in one embodiment, at least one ideal temperature $T_{ideal}$ is defined for the selective activation of the cooling means 15 within at least one operating threshold $L_o$, which, as already described above, is configured as a range of temperatures within which the ideal temperature $T_{ideal}$ may be defined for the selective activation of the cooling means 15.

Consequently the cooling control of the electrical equipment 10 is configured to comprise at least one among selectively activating the cooling means 15, defining at least one ideal temperature $T_{ideal}$, defining the operating threshold $L_o$.

As described, the theoretical and real aging parameters $A_t$, $A_r$ are based on at least one temperature at the hotspot 25, and the deterioration parameter is based on at least one moisture parameter obtained through the sensor set 30.

With regard to the life balance LB, as already mentioned, this is configured to be positive when the rated aging rate is greater than the real aging rate and negative when the real aging parameter is greater than the rated aging parameter, wherein the negative life portion is calculated as the life balance LB when accelerated aging is calculated, and a positive life portion is calculated as the life balance LB when delayed aging is calculated.

Consequently, the electrical equipment 10 is configured to selectively alter at least one among the activation temperatures of the cooling means 15 and a cooling intensity.

Furthermore, an embodiment of the electrical equipment 10 allows generating at least one output S, configured, for example, to issue an alarm at least when the life balance LB module exceeds at least one limit pre-defined by the user U and when no downtrend is detected for the life balance LB module.

Moreover, in one embodiment the life bank LB balance is stored in a database, as already explained.

Thus, with the characteristics described above, it is noted that the present invention can control the operating threshold $L_o$ of the cooling means 15 or generate the parameters for controlling their intensity, depending on the available infrastructure.

In general, FIG. 5 exemplifies a possible topology in light of the characteristics of this invention as described above.

This Figure shows the integration and interaction of the elements in this invention, including the sensor set 30 and the electrical equipment 10 already fitted with the cooling means 15, among others. It also shows an interface with the user U, which may be direct or through a computer system. It is noted that some elements are presented in detail in other Figures, principally FIGS. 1 to 4, as shown in a simplified manner in FIG. 5.

It is noted that the present invention may be installed on a computer system that is remote from the electrical equipment 10 or on a dedicated device and may also be a part of the sensor panel of said equipment 10.

Hence, in general, the present invention is configured to run a cascade of methods for analysing aging, life balance LB and cooling control means 15 in order to efficiently control aging of the electrical equipment 10 through data on temperature and other variables that may influence the lifespan of the said equipment 10. The invention may also analyze data obtained to finetune the implementation of the cascaded methods and provide useful information to the user U.

In order to exemplify a possible embodiment of this invention, Example 1 is presented below.

Example 1

As mentioned, this example merely presents a possible embodiment of the present invention and may not be understood as a limitation, so as other equivalent embodiments may also be implemented and attain the same objectives and advantages.

In principle, there is a plurality of input data that may be considered. For example, oil temperature, winding wire current, hotspot 25 temperature, moisture dissolved in the oil, ambient temperature, the current cooling means 15 status, among others such as signals and data that may be relevant for the implementation and operation of the invention, for either aging calculations, life balance LB, commands or general analyses.

In this case, it will be assumed that it is possible to act only on at least one operating threshold $L_o$, also defining the ideal temperature $T_{ideal}$ for switching on the cooling means 15. These controls may be sent by means of digital or analog signals or communications ports, with the possibility of setting an ideal temperature $T_{ideal}$ for switching each cooling stage off and on.

Consequently, the user U must program the desired operating threshold $L_o$. For this example, the temperature range within which the operating threshold $L_o$ may be positioned must be selected carefully, because the selection of temperatures that exceed the oil flashpoint, the electrical equipment 10 will no longer be heat-protected and may catch fire, among other undesirable situations that may occur.

Once a life bank LB has been established and the operating thresholds $L_o$ have been programmed, some method will be used to decide on the ideal activation temperature $T_{ideal}$ for the cooling stages at each moment.

There are several possible methods that could be implemented, such as stochastic methods or artificial intelligence. In one embodiment, it is even possible to adopt a method as simple as an "ON-OFF" control whereby the cooling means 15 is activated when a negative balance is found and, with a positive balance, the cooling means 15 is switched on only if the temperature reaches the operating safety limit. However, this is a very inefficient way of handling control.

Blending simplicity and efficiency, this Example 1 presents the widely known Proportional Integral Derivative (PID) controller as the mechanism of choice.

In simplified terms, a PID controller such as that shown in FIG. 4 operates in accordance with the following transfer function, as shown in Equation 5:

$$C(s) = K_P + \frac{K_I}{s} + K_D \cdot s \quad \text{(Equation 5)}$$

The $K_P$, $K_I$ and $K_D$ constants of the PID may be selected by the user U, who can also choose which of them will be delegated to the system itself to optimize in the course of the operation.

With regard to these constants:

Control P Proportional, $K_P$: Checks the difference A between A and "$A_{target}$" and adjusts a $T_{on}$ and $T_{off}$, $\Delta T°$, accordingly. In this example, it is used as the main control element.

Control Integral, $K_I$: Considers previous $\Delta A$ and corrects the $\Delta T°$ adjustment. It is configured to prevent accumulations of earlier errors.

Control Differential, $K_D$: Observes the $\Delta A$ variation and corrects the $\Delta T°$ adjustment. It is configured as a buffer that anticipates abrupt adjustments.

With the theoretical machine aging Acorrected$_t$ selected, the PID controller will constantly regulate the ideal temperatures $T_{on}$ and $T_{off}$ within the operating thresholds $L_o$ in order to keep the life bank LB at zero or close to this value.

Similarly, and particularly in the context of Example 1, the PID controller is configured to adjust the temperatures $T_{on}$ and $T_{off}$ and also to measure how long the cooling means 15 will continue to run, consequently performing an aging analysis over a period, calculating an aging variation against a standard.

Moreover, there is the possibility that other sensors may be installed in accordance with the present invention and with the characteristics described.

For example, should ambient temperature sensors be connected to the invention, the above-mentioned analysis methods are improved, as it is easier to distinguish the causes of increased efforts by the cooling means 15.

In this way, bringing together the calculation and computation of the theoretical and real machine agings Acorrected$_t$, Acorrected$_r$, and obtaining the life bank LB and the cooling control principally as a function of these parameters, the present invention is configured to control at least the cooling means 15 for a part of the electrical equipment 10 in an efficient manner.

As the system logs cooling means 15 control decisions, trends in its demands can be detected through analyses using comparative stochastic methods or recognition of standards provided by artificial intelligence, for example. Consequently, the user U is notified of a drop in the efficiency of the cooling means 15 or rising inability to adapt to changes in the operating conditions of the electrical equipment 10.

Heavier demands on the cooling means 15 to attain the same aging rate, despite the load/climate condition remaining unchanged, indicate a loss of efficiency for the cooling means 15, for example.

In this way, the purposes of this invention are attained, while also allowing the owners of these machines—such as power concessionaires, for example—to have better control over their investments (capital expenditure, CAPEX) and operating/maintenance (operational expenditure, OPEX) plans.

Furthermore, this allows the managers of the electrical equipment 10 to schedule maintenance or adaptation before the situation becomes critical, thus ensuring that their engineering sectors do not need to spend their working hours worrying about changes in the operating conditions of this electrical equipment 10 very frequently.

Having described one example of a preferred embodiment, it must be understood that the scope of this invention encompasses other possible variations, being limited only by the content of the Claims appended hereto, with possible equivalents included therein.

The invention claimed is:

1. A cooling control system (1) for electrical equipment (10) comprising at least one sensor set (30), at least one cooling means (15) and at least one controller (20) electrically connected to each other, wherein the cooling control system (1) is configured to obtain at least one theoretical machine aging (Acorrected$_t$), a real machine aging (Acorrected$_r$) and a life balance (LB) and defining at least one ideal temperature ($T_{ideal}$) for the selective activation of the cooling means (15) within at least one operating threshold ($L_o$), wherein the theoretical machine aging (Acorrected$_t$) is obtained through at least one from between a theoretical aging parameter ($A_t$) and a theoretical deterioration parameter ($D_t$), the theoretical aging parameter ($A_t$) being calculated based on at least one theoretical aging temperature ($\Theta_t$) defined by a user (U), wherein the real machine aging ($Acorrected_r$) is obtained through at least one from between a real aging parameter ($A_r$) and a real deterioration parameter ($D_r$), the real aging parameter ($A_r$) being calculated, based on at least one real aging temperature ($\Theta_r$) measured by the sensor set (30), wherein the life balance (LB) is obtained at least through a comparison between the theoretical machine aging ($Acorrected_t$) and the real machine aging ($Acorrected_r$), wherein a positive value is added to the life balance (LB) when the real machine aging ($Acorrected_r$) is less than the theoretical machine aging ($Acorrected_t$) and a negative value is added to the life balance (LB) when the real machine aging ($Acorrected_r$) is greater than the theoretical machine aging ($Acorrected_t$), the cooling control system (1) for electrical equipment (10) being configured for controlling cooling of the electrical equipment (10), based on at least the life balance (LB), wherein the life balance (LB) is positive when the nominal aging rate is greater than the real aging rate and negative when the real aging parameter is greater than the nominal aging parameter, wherein a negative value is added to the life balance (LB) when accelerated aging is calculated, and a positive is added to the life balance (LB) when delayed aging is calculated.

2. The cooling control system (1) for electrical equipment (10), in accordance with claim 1, wherein the cooling control of the electrical equipment (10) may perform at least one among selectively activating the cooling means (15) and defining at least one ideal temperature ($T_{ideal}$).

3. The cooling control system (1) for electrical equipment (10), in accordance with claim 2, wherein the theoretical and real aging parameters ($A_t$, $A_r$) are based on at least one temperature at the hotspot (25) and the deterioration parameter ($D_t$, $D_r$) is based on at least one moisture parameter obtained through the sensor set (30).

4. The cooling control system (1) for electrical equipment (10), in accordance with claim 3, configured to selectively alter between at least one among the activation temperatures of the cooling means (15) and a cooling intensity.

5. The cooling control system (1) for electrical equipment (10), in accordance with claim 4, configured to generate at least one output(S), wherein the output(S) may be configured to issue an alarm when the life balance (LB) module exceeds at least one limit pre-defined by the user and/or when no downtrend is detected for the life balance (LB) module.

6. The cooling control system (1) for electrical equipment (10), in accordance with claim 5, wherein the operating threshold ($L_o$) is configured as a range of temperatures within which the system (1) may define the ideal temperature ($T_{ideal}$) for the selective activation of the cooling means (15).

7. The cooling control system (1) for electrical equipment (10), in accordance with claim 6, wherein the sensor set (30) comprises at least one among a temperature sensor, a moisture sensor, and an electrical magnitude sensor.

8. The cooling control system (1) for electrical equipment (10), in accordance with claim 7, configured to allow the definition of at least one upper limit for the life bank (LB) and at least one lower limit for the life bank (LB), wherein each limit is defined individually.

9. The cooling control system (1) for electrical equipment (10), in accordance with claim 8, wherein, should a limit be defined, the positive balance is calculated when the life bank (LB) balance is below the upper limit for the life bank (LB).

10. The cooling control system (1) for electrical equipment (10), in accordance with claim 9, wherein the historical records of the life bank (LB) balance are stored in a database.

11. A cooling control method for electrical equipment (10), the electrical equipment (10) comprising at least one sensor set (30), at least one cooling means (15), and at least one controller (20) electrically connected to each other, the cooling control method for electrical equipment (15) comprising the steps of:

obtaining at least one theoretical machine aging ($Acorrected_t$) and obtaining at least one real machine aging ($Acorrected_r$);

obtaining at least the life balance (LB);

controlling the life balance (LB) of the electrical equipment (10) based on at least the cooling, wherein controlling the life balance (LB) of the electrical equipment (10) based on at least the cooling comprises at least defining at least one ideal temperature ($T_{ideal}$) for the selective activation of the cooling means (15) within one operating threshold ($L_o$), wherein the life balance (LB) is positive when the rated aging rate is greater than the real aging rate and negative when the real aging parameter is greater than the nominal aging parameter, wherein a negative life portion is added to the life balance (LB) when accelerated aging is calculated, and a positive life portion is added to the life balance (LB) when delayed aging is calculated.

12. The cooling control method for electrical equipment (10), in accordance with claim 11, wherein the theoretical machine aging ($Acorrected_t$) is obtained through at least one from between a theoretical aging parameter ($A_t$) and a theoretical deterioration parameter ($D_t$), the theoretical aging parameter ($A_t$) being calculated, based on at least one theoretical aging temperature ($\Theta_t$) defined by the user.

13. The cooling control method for electrical equipment (10), in accordance with claim 12, wherein the real machine aging ($Acorrected_r$) is obtained through at least one from between a real aging parameter ($A_r$) and a real deterioration parameter ($D_r$), the real aging parameter ($A_r$) being calculated based on at least one real aging temperature ($\Theta_r$) measured by the sensor set (30).

14. The cooling control method for electrical equipment (10), in accordance with claim 13, wherein the step of obtaining at least the life balance (LB) is configured to ensure that the life balance (LB) is obtained at least through a comparison between the theoretical machine aging ($Acorrected_t$) and the real machine aging ($Acorrected_r$), the life balance (LB) added of a positive value when the real machine aging ($Acorrected_r$) is less than the theoretical machine aging ($Acorrected_t$) and being added of a negative value when the real machine aging ($Acorrected_r$) is greater than the theoretical machine aging ($Acorrected_t$).

15. The cooling control method for electrical equipment (10), in accordance with claim 14, wherein the step of controlling the life balance (LB) of the electrical equipment (10) based on at least the cooling is configured to comprise at least one from between selectively activating the cooling means (15) and defining at least one ideal temperature ($T_{ideal}$).

16. The cooling control method for electrical equipment (10), in accordance with claim 15, wherein the theoretical and real aging parameters ($A_t$, $A_r$) are based on at least one temperature ($T_{hsp}$) at the hotspot (20) and the deterioration parameter ($D_t$, $D_r$) is based on at least one moisture parameter obtained through the sensor set (30).

17. The cooling control method for electrical equipment (10), in accordance with claim 16, wherein the step of controlling the cooling of the electrical equipment (10) based on at least the life balance (LB) is configured to selectively alter at least one from between the activation temperatures of the cooling means (15) and a cooling intensity.

18. The cooling control method for electrical equipment (10), in accordance with claim 17, further comprising an additional step of generating at least one output(S), wherein the output(S) is configured to issue at least one alarm, wherein such step is configured to be performed when at least one among when the life balance (LB) module exceeds at least one limit pre-defined by the user or when no downtrend is detected for the life balance (LB) module.

19. The cooling control method for electrical equipment (10), in accordance with claim 18, wherein the operating threshold ($L_o$) is configured as a range of temperatures within which the ideal temperature ($T_{ideal}$) may be defined for the selective activation of the cooling means (15).

20. The cooling control method for electrical equipment (10), in accordance with claim 19, characterized in that it also comprises further comprising an additional step of defining at least one upper limit for the life bank (LB) and at least one lower limit for the life bank (LB), wherein each limit is defined individually.

21. The cooling control method for electrical equipment (10), in accordance with claim 20, wherein, should a limit be defined, the positive balance is calculated when the life bank (LB) balance is below the upper limit for the life bank (LB).

22. The cooling control method for electrical equipment (10), in accordance with claim 21, further comprising an additional step of storing the life bank (LB) balance in a database.

23. Electrical equipment (10) comprising at least one sensor set, at least one cooling means (15), and at least one controller (20), electrically connected to each other, wherein the electrical equipment (10) is configured to control the cooling of the electrical equipment (10), based on at least the life balance (LB),
wherein the life balance (LB) is obtained at least through a comparison between a theoretical machine aging (A$corrected_t$) and a real machine aging (A$corrected_r$), the life balance (LB) being as added of a positive value when the real machine aging (A$corrected_r$) is less than the theoretical machine aging (A$corrected_t$) and being added of a negative value when the real machine aging (A$corrected_r$) is greater than the theoretical machine aging (A$corrected_t$),
wherein the theoretical machine aging (A$corrected_t$) is obtained through at least one from among a theoretical aging parameter ($A_t$) and a theoretical deterioration parameter ($D_t$), the theoretical aging parameter ($A_t$) being calculated, based on at least one theoretical aging temperature ($\Theta_t$) defined by the user,
wherein the real machine aging (A$corrected_r$) is obtained through at least one from among a real aging parameter ($A_r$) and a real deterioration parameter ($D_r$), the real aging parameter ($A_r$) being calculated, based on at least one real aging temperature ($\Theta_r$) measured by the sensor set,
wherein at least one ideal temperature ($T_{ideal}$) is defined for the selective activation of the cooling means (15) within at least one operating threshold ($L_o$), where
the life balance (LB) is configured to be positive when the nominal aging rate is greater than the real aging rate and negative when the real aging parameter is greater than the nominal aging parameter, wherein
a negative value is added to the life balance (LB) when accelerated aging is calculated, and
a positive value is added to the life balance (LB) when delayed aging is calculated.

24. The electrical equipment (10), in accordance with claim 23, wherein the cooling control of the electrical equipment (10) is configured to perform at least one from among selectively activating the cooling means (15), defining at least one ideal temperature ($T_{ideal}$), defining the operating threshold ($L_o$).

25. The electrical equipment (10), in accordance with claim 24, wherein the theoretical and real aging parameters ($A_t$, $A_r$) are based on at least one temperature at the hotspot (25) and the deterioration parameter ($D_t$, $D_r$) is based on at least one moisture parameter obtained through the sensor set.

26. The electrical equipment (10), in accordance with claim 25, configured to selectively alter at least one from among the activation temperatures of the cooling means (15) and a cooling intensity.

27. The electrical equipment (10), in accordance with claim 26, configured to generate at least one output(S), wherein the output(S) is configured to issue an alarm at least when the life balance (LB) module exceeds at least one limit pre-defined by the user and/or when no downtrend is detected for the life balance (LB) module.

28. The electrical equipment (10), in accordance with claim 27, wherein the operating threshold ($L_o$) is configured as a range of temperatures within which the system (1) may define the ideal temperature ($T_{ideal}$) for the selective activation of the cooling means (15).

29. The electrical equipment (10), in accordance with claim 28, wherein the sensor set (30) comprises at least one from among a temperature sensor, a moisture sensor, and an electrical magnitude sensor.

30. The electrical equipment (10), in accordance with claim 29, configured to define at least one upper limit for the life bank (LB) and at least one lower limit for the life bank (LB), wherein each limit is defined individually.

31. The electrical equipment (10), in accordance with claim 30, wherein, should a limit be defined, the positive balance is calculated when the life bank (LB) balance is below the upper limit for the life bank (LB).

32. The electrical equipment (10), in accordance with claim 31, wherein the life bank (LB) balance is stored in a database.

\* \* \* \* \*